(12) United States Patent
Tillis

(10) Patent No.: US 7,943,191 B2
(45) Date of Patent: May 17, 2011

(54) EGG BASED FOODSTUFF RESEMBLING FRENCH FRIES AND THE METHOD OF MAKING SAME

(75) Inventor: Marc Tillis, Roseville, MN (US)

(73) Assignee: Rembrandt Enterprises, Inc., Rembrandt, IA (US)

( * ) Notice: Subject to any disclaimer, the term of this patent is extended or adjusted under 35 U.S.C. 154(b) by 1219 days.

(21) Appl. No.: 11/599,172

(22) Filed: Nov. 14, 2006

(65) Prior Publication Data

US 2007/0087106 A1  Apr. 19, 2007

Related U.S. Application Data

(63) Continuation-in-part of application No. 11/106,968, filed on Apr. 15, 2005, now abandoned, which is a continuation-in-part of application No. 11/051,293, filed on Feb. 4, 2005, now abandoned.

(51) Int. Cl.
A23L 1/32 (2006.01)

(52) U.S. Cl. ........ 426/614; 426/512; 426/516; 426/517; 426/518; 426/523

(58) Field of Classification Search .................. 426/614, 426/512, 516–518, 523
See application file for complete search history.

(56) References Cited

U.S. PATENT DOCUMENTS

| | | | | |
|---|---|---|---|---|
| 3,073,704 | A | 1/1963 | Rivoche | 426/573 |
| 3,537,386 | A | 11/1970 | Grosbard | 99/353 |
| 4,469,708 | A | 9/1984 | Rapp et al. | 426/103 |
| 5,151,293 | A | 9/1992 | Vassiliou | 426/614 |
| 6,620,449 | B1* | 9/2003 | Peers | 426/523 |
| 2003/0118714 | A1 | 6/2003 | Merkle et al. | 426/614 |
| 2003/0134030 | A1 | 7/2003 | Merkle et al. | 426/614 |
| 2004/0067283 | A1 | 4/2004 | Hudson et al. | 426/94 |
| 2005/0186322 | A1* | 8/2005 | Hudson et al. | 426/614 |
| 2005/0255217 | A1* | 11/2005 | Hudson et al. | 426/614 |
| 2006/0141099 | A1* | 6/2006 | Hudson et al. | 426/94 |
| 2006/0177562 | A1* | 8/2006 | Tillis | 426/614 |
| 2006/0177563 | A1* | 8/2006 | Tillis | 426/614 |
| 2007/0087105 | A1* | 4/2007 | Tillis | 426/614 |
| 2010/0143553 | A1* | 6/2010 | Hudson et al. | 426/300 |

FOREIGN PATENT DOCUMENTS

| | | |
|---|---|---|
| JP | 56121457 | 9/1981 |
| JP | 58040069 | 3/1983 |
| JP | 58043764 | 3/1983 |
| JP | 2000175656 | 6/2000 |
| JP | 2002191327 | 7/2002 |
| JP | 2002223728 | 8/2002 |
| JP | 2002306347 | 10/2002 |
| WO | WO 00/32078 | 6/2000 |

OTHER PUBLICATIONS

Webpage, Deep Fried Eggs, Oct. 11, 2004, 1 page.
Webpage, Deep-Fried Coated Eggs, Oct. 11, 2004, 1 page.
Hormel Foods website, Glossary term for French Fry. http://www.hormel.com/kitchen/glossary.asp?id=33328&catitemid=.
Grodner et al., "Chemical Composition of Seafood Breading and Batter Mixes", Cereal Chemistry, 68(2):162-164.

* cited by examiner

*Primary Examiner* — Anthony Weier
(74) *Attorney, Agent, or Firm* — Z. Peter Sawicki; Westman, Champlin & Kelly, P.A.

(57) ABSTRACT

A method of making an egg based product includes providing a selected amount of a liquid egg base that is poured onto a cooking surface such that the egg base has a selected thickness. The egg base is heated to a selected temperature such that the liquid egg base coagulates into a solid mass. The solid mass is formed into French fry shaped pieces and transferred to an oven where the French fry shaped pieces are subsequently baked for a selected amount of time. The French fry shaped pieces are removed from the oven for consumption or refrigerated or placed in frozen storage for reheating by an end user or consumer.

21 Claims, No Drawings

EGG BASED FOODSTUFF RESEMBLING FRENCH FRIES AND THE METHOD OF MAKING SAME

The present application is a continuation-in-part application of and claims priority of U.S. patent application Ser. No. 11/106,968, filed Apr. 15, 2005, now abandoned, which is a continuation-in-part of and claims priority of U.S. patent application Ser. No. 11/051,293, filed Feb. 4, 2005, now abandoned, the content of which is hereby incorporated by reference in its entirety.

BACKGROUND OF THE INVENTION

The present invention relates to a baked egg based product. More particularly, the present invention relates to a baked egg based product made to resemble a potato product such as a French fry that is baked and not fried.

Eggs are a very nutritious food source that have a high protein content and essentially no carbohydrate content. Shell eggs contain on average 65.5 weight percent water, 12 weight percent protein, 11 weight percent fat with the remainder being made up of other constituents (USDA Egg Grading Manual 1969. Agricultural Handbook No. 75). The popularity of eggs as a food source has increased with the increase in popularity of high protein/low carbohydrate diets.

Many people find staying on the strict high protein/low carbohydrate diet to be burdensome because most meals purchased at a restaurant include some form of carbohydrates, typically as a bread product or as a potato product. For instance, prior to consuming food from a fast food restaurant such as a hamburger, the dieter must remove the bun and cannot eat French fried potatoes that are typically sold along with the hamburger. As a result, most dieters on the low carbohydrate diets do not eat at fast food restaurants which can pose an inconvenience to people with busy schedules.

Because most restaurants do not have menu items that conform to the high protein/low carbohydrate diet, most dieters are forced to prepare their own food. With the busy and fast paced lifestyles of many people, there may not be enough time to prepare every meal. Therefore, the dieter may find it trying to maintain the high protein/low carbohydrate diet compatible with his/her lifestyle.

Further, maintaining the high protein/low carbohydrate diet can be difficult due to the limited number and types of food that can be consumed. The dieter can easily become bored with the limited selection and stray from the high protein/low carbohydrate diet. Many times the dieter may simply want a sandwich, an item that is not in compliance with the high protein/low carbohydrate diet because of the carbohydrates in the bread.

To accommodate the trend to the high protein/low carbohydrate diet, high protein/low carbohydrate breads are being sold to allow dieters to eat some bread products while staying on the strict diet. However, there is a need to develop high protein/low carbohydrate substitutes for potato based products, such as the popular French fry. There is a further need of developing a healthier product that is baked and not fried.

SUMMARY OF THE INVENTION

The present invention includes a method of making an egg based product that resembles a French fried potato also called a French fry. The method includes heating a liquid egg base to a selected temperature such that the liquid egg base coagulates into a solid mass. The solid mass is formed such as by cutting or slicing it into a French fry shape then transferred to an oven where the French fry shapes are subsequently baked for a selected amount of time such that the French fry shaped pieces have a crisp exterior with no exterior batter, the crisp exterior having a texture of a baked French fry potato. The French fry shape is removed from the oven, coated or seasoned, then is consumed or refrigerated or frozen for future reheating and consumption. The present invention also includes a baked egg based product comprising an egg based mixture sufficiently cooked to form a coagulated mass and wherein the coagulated mass has then been baked. The present invention also includes an egg based product comprising a coagulated mass of a scrambled egg mixture formed into a shape of a French fry and wherein the French fry shaped coagulated mass is baked for a selected period of time to resemble a French fried potato such that the French fry shaped pieces have a crisp exterior with no exterior batter, the crisp exterior having a texture of a baked French fry potato.

Alternatively, the liquid egg base is partially cooked and agitated to produce a homogenous paste. The homogeneous paste is then extruded to produce a paste strip. The paste strip is then baked such that the French fry shaped pieces have a crisp exterior with no exterior batter, the crisp exterior having a texture of a baked French fry potato.

DETAILED DESCRIPTION OF THE PREFERRED EMBODIMENTS

The present invention relates to a baked egg based product and a method of producing the baked egg based product that effectively resembles a French fry in appearance. The baked egg based product has a high protein content, and a low carbohydrate content, thereby providing an alternative to the potato based products such as French fried potatoes which have a high carbohydrate (i.e., starch) content. By being subsequently baked and not deep fried in oil, the fat content of the product is also minimized.

The baked egg based product is preferably shaped like a French fry. However, other configurations of the baked egg based product are within the scope of the present invention. The baked egg based product has a crisp exterior similar to the texture of a baked French fry. The baked egg based product does not have a dough exterior. By dough is meant a paste made out of a cereal grain or legume that has been ground to a flour or meal and water added. Exemplary cereal grains include maize (corn), wheat, rice, rye, oats, millet, sorghum, buckwheat and the like. Exterior coatings without dough for purposes of this application are not considered batter or batter-type coatings. Such exterior coatings may include flavors or flavorings such as cheese, salt, garlic, spices and herbs and are discussed in more detail below.

A starting egg ingredient for the egg based product is egg whites, egg yokes or whole eggs. The starting egg ingredient should be stirred to produce as homogenous a blend as possible. Reconstituted egg solids may also be used as a starting ingredient in the present invention. A commercially available scrambled egg mixture (SEM) may also be used as a starting ingredient for the egg based product. Hereinafter throughout the application, the phrase egg mixture (EM) shall mean whole eggs, egg whites, egg yokes, reconstituted egg solids or commercially available scrambled egg mixture or any mixture thereof.

The EM is poured onto a cooking sheet that is configured to retain the EM at a selected thickness. The EM is heated to an effective temperature to coagulate the EM into a solid mass or a matrix. The EM is typically heated until the temperature of the EM elevates to a temperature of between about 150° F. and about 190 to 200° F.

The EM can be heated to the coagulating temperature with any suitable cooking device. Coagulation of the EM begins at approximately 150° F. and fully coagulates at 180° F. to 200° F. The EM can be heated in an oven with a single cooking sheet at a time or with multiple cooking sheets at a time. The EM can also be heated in a band oven with a continuous cooking sheet. The temperature of the oven is in a range of between about 250° F. to about 450° F. and preferably in a range of between about 300° F. and about 400° F., and most preferably between 325° F. to 360° F. for up to about 5 minutes to 10 minutes.

The EM can also be placed in a plastic boiling bag and submerged in a hot liquid to heat the EM to the coagulating temperature. The EM can also be heated to coagulating temperatures in an extruder where the EM is formed into a continuous ribbon of coagulated mass having a selected cross-section. Alternatively, the EM can be partially heated to near or partial coagulating temperatures in an extruder or heat exchanger and heated to coagulating temperatures in another heating source such as an oven. Whatever the heating source, the EM is heated to the selected temperature to form a coagulated solid mass or matrix.

For subsequent baking in an oven, the oven may be powered by electricity, gas or other fuel source and the oven may bake using radiant, convective or microwave energy in which air movement may or may not be assisted by a fan. In addition, steam heat may be used as a sole or additional heat source. The formed coagulated pieces may also be refrigerated or frozen and then subsequently cut and baked. If The EM is baked in a conventional radiant oven, it is baked at temperatures in a range of between about 300° F. and about 500° F. for up to 10 minutes and preferably at temperatures in a range of between about 350° F. and about 400° F. for about 0.5 to 8 minutes.

Exemplary time/temperature conditions suitable for conventional, convection, and combination convection and steam ovens are set forth below for use in the present invention. An 1100 gram egg mix in a 12×18 inch cookie sheet was used to obtain the data for each type of oven. The egg mixture was at approximately 40° F. when inserted into first stage baking.

|  | First Stage Baking | | Second Stage Baking | |
| --- | --- | --- | --- | --- |
| Oven Type | Temperature | Time | Temperature | Time |
| Conventional | 350 to 400° F. | 10 to 14 minutes | 350 to 400° F. | 8 to 11 minutes |
| Convection | 325 to 340° F. | 7 to 10 minutes | 315 to 335° F. | 4 to 6 minutes |
| Convection + Steam | 325 to 340° F. | 5 to 8 minutes | 315 to 335° F. | 4 to 6 minutes |

Options for a conventional, convection and a convection with steam oven are set forth below for an 1100 gram egg mix in a 12×18 inch cookie sheet which the egg mix was placed into the first stage baking oven at 150° F.

|  | First Stage Baking | | Second Stage Baking | |
| --- | --- | --- | --- | --- |
| Oven Type | Temperature | Time | Temperature | Time |
| Conventional | 350 to 400° F. | 4 to 8 minutes | 350 to 400° F. | 3 to 8 minutes |
| Convection | 325 to 340° F. | 2 to 6 minutes | 325 to 350° F. | 2 to 5 minutes |
| Convection + Steam | 325 to 340° F. | 1.5 to 5 minutes | 325 to 350° F. | 2 to 5 minutes |

After the coagulated mass is formed, the coagulated mass is formed into pieces that resemble a French fry. French fried potatoes come in various shapes including, but not limited to a traditional longitudinal strip having a substantially square cross sectional area, a "shoe string" shape which is a narrow version of the traditional French fry, a traditional French fry shape but with a rippled surface, an American fry shape which is usually a thin disk, a crosscut fry shape (a thin disk with a crisscross pattern), or any other shape. Depending upon the scope of production of the egg based product, the coagulated mass can be manually cut or cut with a cutting machine. The EM can also be heated to the coagulating temperature in molds thereby eliminating the need to cut the coagulated mass into the desired configuration, and eliminating the need for a subsequent second baking step.

The formed pieces are subsequently placed in an oven at a selected cooking temperature for a selected amount of time such that the EM pieces have a crisp surface similar to that of a baked French fried potato. An important aspect of baking the EM pieces is to ensure that the pieces have a crisp exterior on all sides. Having crisp surfaces on all sides will ensure that the EM pieces are somewhat similar to the textural and organoleptic properties of a baked French fried potato.

Using steam as an additional source, the steam may be varied from 1% humidity to over 50% humidity, and such humidity will affect cooking time accordingly. The steam can also be periodically shutoff and put back on during cooking to get proper finished product consistency.

The baked EM may be consumed or stored for later consumption. Optionally, a seasoning may be coated onto the baked EM. A non-exhaustive list of seasonings include salt, pepper, salt substitutes, spices, extracts, various flavorants, cheese powders and coatings that are well known and found on any snack foods in either a liquid or solid state.

Prior to heating the EM to coagulating temperatures, optional generally recognized as safe ingredients (GRAS) may be added to the EM to modify or enhance the flavor, texture and appearance of the baked egg based product. Water is preferably added to the EM to make the consumable product lighter and less dense. While an optional ingredient, water is preferably added to the EM in a range of between about 5 to 40 percent of the weight of the EM.

Water binding ingredients, such as water binding carbohydrates and hydrophilic colloids, are optionally and preferably added at an effective weight percentage to keep the water from evaporating from the EM during the heating process as well as providing freeze thaw stability during the freezing and subsequent reheating for consumption. A non-exhaustive list of water binding carbohydrates that can be added to the EM includes; pre-gel starch, refined potato such as potato flour or potato flakes, corn starch, modified corn starch, arrowroot starch, tapioca starch or any combination thereof. A non-exhaustive list of hydrophilic colloids that can be added to the EM includes xanthan gum, locust bean gum, carob gum, guar gum, carrageenan and pectin or any combination thereof.

Vegetable oil may optionally be added to the EM to enhance mouth feel of the finished product. Vegetable oils that are added to the EM include, but are not limited to; olive oil, coconut oil, peanut oil, sunflower oil, corn oil, canola oil, safflower oil and soybean oil. The vegetable oils are optionally added to the EM in a range of up to about 12 weight percent of the EM and preferably about 3 weight percent of the EM.

Other GRAS ingredients can be added to the EM to enhance the taste of the egg based product prior to heating the EM into the coagulated mass. A non-exhaustive list of ingredients includes vegetables, fruit, meat or dairy products such as cheese and natural or artificial flavors or both. The vegetables, fruit, meat and dairy products are added to selected weight percents of the baked egg based product provided the baked egg based product has a continuous EM portion with the other ingredients dispersed therein. Typically up to about 25% (on a weight basis) of the product may be added GRAS ingredient(s) and up to about 50% (on a weight basis) is possible although not preferred.

It has been discovered that the method of the present invention and the resulting products manufactured by the method are very palatable, high protein alternatives to traditionally high carbohydrate food stuffs such as French fries.

The following Examples are illustrative only and are not intended to limit the present invention in any way.

Example 1

An EM was produced having the following composition:

| Whole Eggs | 77.2 |
| Water | 18 |
| Pre-Gel Starch | 0.75 |
| Xanthan Gum | 0.05 |
| Potato Flakes | 1 |
| Vegetable Oil | 3 |

The ⅜ inch thick sheet of EM was heated in a conventional oven at 350° F. for 12 minutes until the EM coagulated into a solid mass.

The coagulated mass was cut into strips resembling French fries. The strips were baked in a conventional radiant oven for about 10 minutes at 350° F. The baked coagulated egg based strips had a crisp exterior surface similar to the texture of a baked French fry potato and a pleasing taste. Five parts seasoning was added to 95 parts cut strips, the seasoning applied on top of a dextrin/water or oil coating. Product was then Individually Quick Frozen (IQF) frozen for future reheating and consumption.

Examples 2-6 were cooked under the conditions described in Example 1 with the ingredients being varied.

Example 2

| Ingredient | % |
| --- | --- |
| Whole Eggs | 68.2 |
| Water | 25 |
| Pre-Gel Starch | 0.75 |
| Xanthan Gum | 0.05 |
| Potato Flour | 3 |
| Vegetable Oil | 3 |

After the second baking, five parts seasoning was added to 95 parts cut, baked strips, the seasoning applied on top of a dextrin/water solution or oil coating. The product had a crisp exterior surface similar to the texture of a baked French fry potato. Product was then IQF frozen for future reheating and consumption.

Example 3

| Ingredient | % |
| --- | --- |
| Whole Eggs | 40.2 |
| Water | 25 |
| Pre-Gel Starch | 0.75 |
| Xanthan Gum | 0.05 |
| Potato Flour | 1 |
| Vegetable Oil | 3 |
| Egg Whites | 30 |

After the second baking, five parts seasoning was added to 95 parts cut and baked strips. The seasoning was applied on top of a dextrin/water solution or oil coating. The product had a crisp exterior surface similar to the texture of a baked French fry potato. Product was then IQF frozen for future reheating and consumption.

Example 4

| Ingredient | % |
| --- | --- |
| Whole Eggs | 68.7 |
| Water | 16.5 |
| Pre-Gel Starch | 0.75 |
| Xanthan Gum | 0.05 |
| Potato Flour | 1 |
| Vegetable Oil | 3 |
| Diced Cheese | 10 |

After the second baking, one part salt was added to 99 parts cut strips. The seasoning was applied directly on top of the baked strip or on top of a dextrin/water solution or oil coating. The product had a crisp exterior surface similar to the texture of a baked French fry potato. Product was then IQF frozen for future reheating and consumption.

Example 5

| Ingredient | % |
| --- | --- |
| Whole Eggs | 68.2 |
| Water | 21 |
| Pre-Gel Starch | 0.75 |
| Xanthan Gum | 0.05 |
| Potato Flour | 1 |
| Vegetable Oil | 3 |
| Jalapenos | 6 |

For the second baking, one part salt was added to 99 parts cut strips, the seasoning applied directly on top of the baked strip or on top of a dextrin/water solution or oil coating, then frozen.

Example 6

| Ingredient | % |
| --- | --- |
| Whole Eggs | 40.2 |
| Water | 15 |
| Pre-Gel Starch | 0.75 |
| Xanthan Gum | 0.05 |
| Potato Flour | 1 |
| Vegetable Oil | 3 |
| Egg Whites | 30 |
| Diced Cheese | 10 |

After the second baking, one part salt was added to 99 parts cut strips.

The seasonings used in Examples 1-6 include nacho, pizza, barbecue, salt, and maple, sugar and cinnamon. The product had a crisp exterior surface similar to the texture of a baked French fry potato. Other seasonings can of course be substituted to obtain the flavor desired.

Examples 1-6 were also done using a convection oven with steam. The results were the same. Cooking times were less.

Alternatively, a one time baking method can be used to produce the product of the present invention. The EM is partially cooked to an extent that the proteins partially coagulate. Partial cooking at a temperature up to 160 F to 170 F may be suitable. The product is agitated so that a homogeneous mixture results. Such agitation may be done through use of various types of food processing equipment such as shear pumps, colloid mills, homogenizers, CR mixers, scraped surface pumps, or other types of mixers either alone or in combination. The time and temperature is chosen so that after agitation of the partially cooked mixture, the result is a thick slurry type consistency similar to a thick "cream of wheat" or other thick material which can maintain it's shape when extruded or formed.

GRAS ingredients such as cheese, vegetables, or other seasoning are added to this slurry. The thick slurry is then extruded into a French fry potato shape. The extruded shape is then baked in an oven at a temperature between 250 F and 400 F, or preferably between 300 F and 350 F, to produce a thin French fry shape so it resembles and has a similar texture to French fried potatoes. The product is then seasoned accordingly and consumed or frozen until reheated for consumption.

Although the present invention has been described with reference to preferred embodiments, workers skilled in the art will recognize that changes may be made in form and detail without departing from the spirit and scope of the invention.

What is claimed is:

1. A method of making an egg based product comprising:
   heating a liquid egg base to a selected temperature such that the liquid egg base coagulates into a solid mass;
   forming the solid mass into French fry shaped pieces;
   baking the French fry shaped pieces for a selected amount of time in an oven such that the French fry shaped pieces have a crisp exterior with no exterior batter similar to the texture of a baked French fry potato; and
   removing the French fry shaped pieces from the oven for consumption or storage.

2. The method of claim 1 and further comprising:
   pouring a selected amount of the liquid egg base onto a cooking surface such that the egg base has a selected thickness.

3. The method of claim 1 wherein forming the solid mass into a French fry shape includes:
   slicing the solid mass into strips resembling the size and shape of a potato based French fry.

4. The method of claim 1 and wherein the liquid egg base comprises:
   a selected amount of a starter egg product; and
   a selected amount of water.

5. The method of claim 4 and wherein the selected amount of starter egg product comprises between about 50 weight percent and 85 weight percent of the liquid egg base.

6. The method of claim 4 and wherein the starter egg product comprises whole scrambled eggs.

7. The method of claim 1 and wherein the liquid egg base comprises a selected amount of a cooking oil.

8. The method of claim 1 and wherein the cooking oil comprises up to about 12 weight percent of the liquid egg base.

9. The method of claim 1 and wherein the liquid egg base comprises a selected amount of a water binding carbohydrate.

10. The method of claim 9 and wherein the water binding carbohydrate comprises a starch.

11. The method of claim 1 and wherein the liquid egg base is heated in an oven at a temperature of between about 300° F. and 500° F. for up to about 10 minutes.

12. The method of claim 1 and wherein the coagulated mass is cut and baked at a temperature of between about 300° F. and 500° F.

13. A method of making an egg based product comprising:
   heating a liquid egg base to a selected temperature such that the liquid egg base coagulates into a solid mass;
   forming the solid mass into French fry shaped pieces;
   storing the solid mass in a frozen condition; and
   baking the French fry shaped pieces taken from frozen storage such that the French fry shaped pieces have a crisp exterior with no exterior batter on all sides with the texture similar to a baked French fry potato.

14. A baked egg based product in the form of a French fry and is the result of an egg based mixture sufficiently cooked to form a coagulated solid mass subsequently cut into French fry shaped pieces and wherein the French fry shaped pieces have been subsequently baked and have a crisp exterior similar to a baked French fry potato and remain as the solid mass after cutting and baking.

15. The baked egg based product of claim 14 and wherein the egg based mixture comprises coagulated whole eggs.

16. The baked egg based product of claim 14 and wherein the egg based mixture comprises:
   a selected amount of an egg component; and
   a selected amount of water.

17. The baked egg based product of claim 16 and wherein the egg component comprises more than 65 weight percent of the egg based mixture.

18. The baked egg based product of claim 14 and wherein the egg based mixture further comprises a vegetable oil.

19. The baked egg based product of claim 18 and wherein the vegetable oil comprises up to about 12 weight percent of the egg based mixture.

20. The baked egg based product of claim 14 and wherein the egg based mixture further comprises a water binding carbohydrate or hydrocolloid or both.

21. The baked egg based product of claim 14 wherein the exterior surface has no exterior batter.

* * * * *